(12) United States Patent
Aizawa

(10) Patent No.: US 9,174,665 B2
(45) Date of Patent: Nov. 3, 2015

(54) CONSTRUCTION FOR FASTENING A BEARING AND A STEERING GEAR UNIT USING THIS CONSTRUCTION FOR FASTENING A BEARING

(75) Inventor: Toshiyuki Aizawa, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/110,453

(22) PCT Filed: Jul. 2, 2012

(86) PCT No.: PCT/JP2012/066869
§ 371 (c)(1),
(2), (4) Date: Nov. 15, 2013

(87) PCT Pub. No.: WO2013/005713
PCT Pub. Date: Jan. 10, 2013

(65) Prior Publication Data
US 2014/0116167 A1     May 1, 2014

(30) Foreign Application Priority Data

Jul. 4, 2011    (JP) .................................. 2011-148063
Aug. 30, 2011  (JP) .................................. 2011-186732

(51) Int. Cl.
*B62D 3/12*      (2006.01)
*F16C 35/067*    (2006.01)
(Continued)

(52) U.S. Cl.
CPC ................ *B62D 3/12* (2013.01); *F16B 21/183* (2013.01); *F16C 35/067* (2013.01); *F16C 35/07* (2013.01);
(Continued)

(58) Field of Classification Search
CPC ................................. B62D 3/12; F16C 35/067
USPC ........................... 280/93.513, 93.514; 74/425
See application file for complete search history.

(56) References Cited

U.S. PATENT DOCUMENTS

2003/0167869 A1\*  9/2003  Burgman et al. ............ 74/412 R
2005/0172744 A1\*  8/2005  Koyama et al. .................. 74/425
(Continued)

FOREIGN PATENT DOCUMENTS

JP     U-S58-2407    1/1983
JP     U-S58-8670    1/1983
(Continued)

OTHER PUBLICATIONS

Chamfer Dimension Limits for Thrust Bearings [online]. NSKF Bearings (an international bearing retailer) [retrieved Jan. 6, 2009]. Retrieved from the Internet: <URL: http://web.archive.org/web/20090106003439/http://www.nskf-bearings.com/bearingshandbook/BearingToleranceStandards/ChamferDimensionLimits3.htm>.\*

(Continued)

*Primary Examiner* — Ruth Ilan
*Assistant Examiner* — Barry Gooden, Jr.
(74) *Attorney, Agent, or Firm* — Katten Muchin Rosenman LLP

(57) ABSTRACT

Provided is simple construction, in a mechanical apparatus such as a rack and pinion steering gear unit, for fastening a bearing that supports thrust loads to a member of the mechanical apparatus using a tapered snap ring, such that there is high rigidity against thrust loads. With the outer ring 17 of the bearing 15 positioned with respect to the housing 11a so that the axial length $L_{27}$ between the circumferential edge of the axial one side surface 32a of the locking groove 27 and the axial one side surface 34 of the outer ring 17 is less than the maximum thickness $T_{28a}$ of the tapered snap ring 28a, the tapered snap ring 28a is locked into the locking groove 27. The gap 35 is provided between the axial other side surface 31 of the tapered snap ring 28a and the axial other side surface 33 of the locking groove 33.

5 Claims, 9 Drawing Sheets

(51) Int. Cl.
 *F16B 21/18* (2006.01)
 *F16C 35/07* (2006.01)
 *F16C 19/06* (2006.01)
 *F16C 19/16* (2006.01)

(52) U.S. Cl.
 CPC ............... *F16C 19/06* (2013.01); *F16C 19/16* (2013.01); *F16C 2226/74* (2013.01); *F16C 2240/30* (2013.01); *F16C 2240/40* (2013.01); *F16C 2326/24* (2013.01); *F16C 2361/61* (2013.01); *Y10T 74/18808* (2015.01)

(56) References Cited

U.S. PATENT DOCUMENTS

| | | | |
|---|---|---|---|
| 2005/0241425 A1* | 11/2005 | Oguma | 74/473.1 |
| 2005/0247151 A1* | 11/2005 | Yamamoto et al. | 74/425 |
| 2006/0196295 A1* | 9/2006 | Maeda et al. | 74/425 |
| 2007/0221004 A1* | 9/2007 | Maeda | 74/425 |

FOREIGN PATENT DOCUMENTS

| | | |
|---|---|---|
| JP | 61-124471 U | 8/1986 |
| JP | 2004-17872 A | 1/2004 |
| JP | 2004-189039 A | 7/2004 |
| JP | 2004-203212 A | 7/2004 |
| JP | 2004-276638 A | 10/2004 |
| JP | 2005-69476 A | 3/2005 |
| JP | 2009-184591 A | 8/2009 |
| JP | 2010-38254 A | 2/2010 |

OTHER PUBLICATIONS

International Search Report and Written Opinion dated Sep. 25, 2012 from the corresponding PCT/JP2012/066869.

Notification of Reasons for Rejection dated Jan. 7, 2014, from corresponding JP Application No. 2011-186732.

Notification of Reasons for Rejection dated Aug. 6, 2013, from corresponding JP Application No. 2011-148063.

* cited by examiner

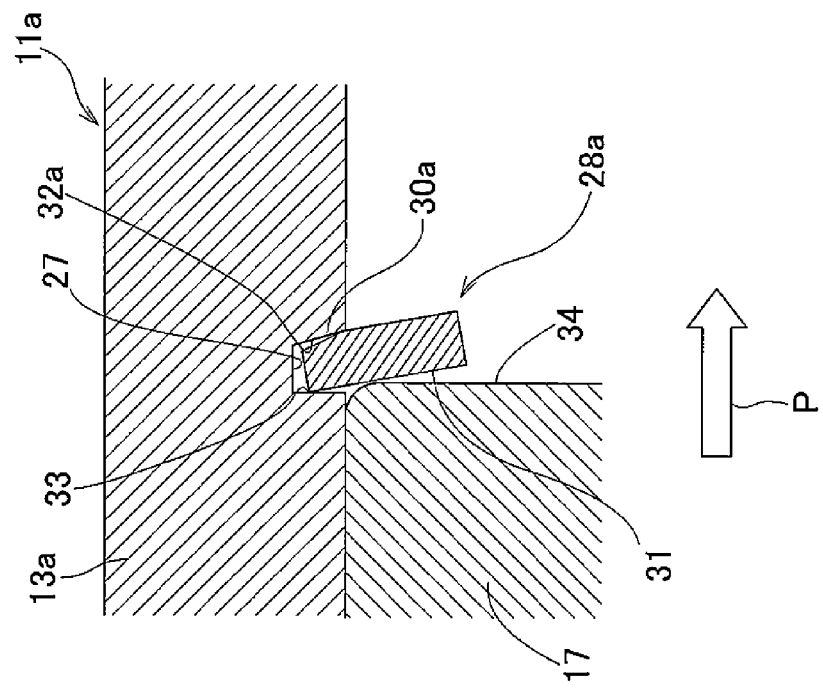
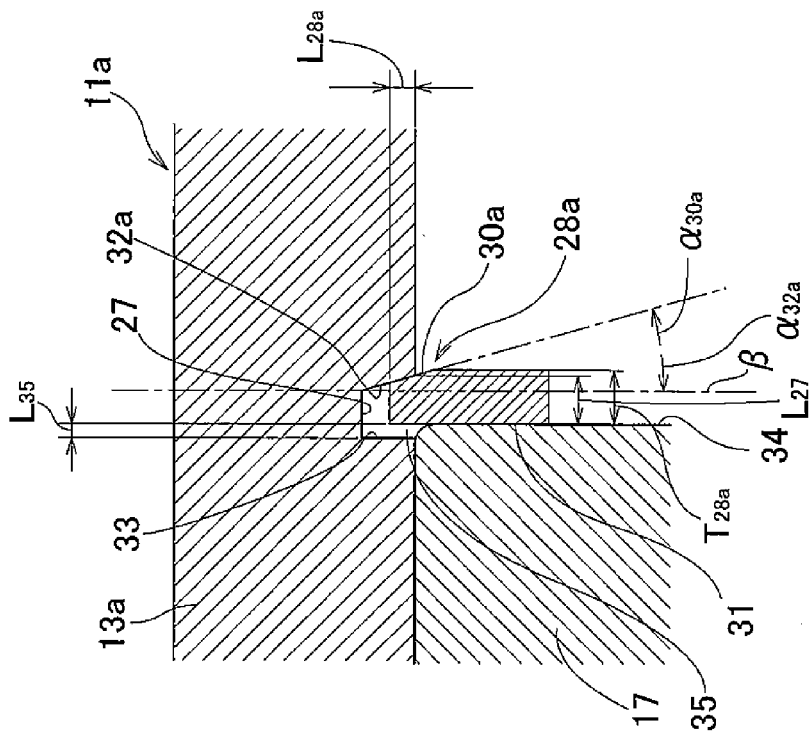

Prior Art

Prior Art

Prior Art

CONSTRUCTION FOR FASTENING A BEARING AND A STEERING GEAR UNIT USING THIS CONSTRUCTION FOR FASTENING A BEARING

TECHNICAL FIELD

The present invention relates to construction for fastening a bearing to a member of a mechanical apparatus, and more particularly to construction for fastening a bearing that supports a thrust load to a housing and shaft using a tapered snap ring. Moreover, the present invention relates to a steering gear unit of a steering apparatus for applying a steering angle to the steered wheels of an automobile, and more particularly to a rack and pinion steering gear unit.

BACKGROUND ART

A rack and pinion steering gear unit is used as a mechanism for converting rotating motion that is inputted from a steering wheel to linear motion for applying a steering angle to steered wheels. Construction of a steering apparatus that comprises this kind of rack and pinion steering gear unit is already widely used as disclosed in JP 2009-184591 (A), JP 2004-17872(A) and JP 61-124471(U).

FIG. 6 illustrates an example of a conventional steering apparatus in which a rack and pinion steering gear unit is assembled. In this steering apparatus, in order to reduce the operating force of the steering wheel 1, an auxiliary operating force from a motor 3 that is installed in the middle section of the steering column 2 is applied to the steering shaft (not illustrated in the figure). The movement of the steering shaft that rotates as the steering wheel 1 is operated, is transmitted to an intermediate shaft 4, and by way of a pinion shaft 5, causes the rack shaft 9 (see FIG. 7) of a rack and pinion type steering gear unit 6 to move back-and-forth, which steers the steered wheels by way of a pair of left and right tie rods 7.

As illustrated in FIG. 7 and FIG. 8, in a rack and pinion steering gear unit 6 of this kind of steering apparatus, pinion teeth 8 that are formed on part in the axial direction (tip end half section) of the pinion shaft 5 engage with rack teeth 10 that are formed on the front surface (surface on the top side in FIG. 7 and FIG. 8) of the rack shaft 9. A helical rack having a twisted angle is used for the rack teeth 10, and to correspond to this, a helical gear having a twisted angle is used for the pinion teeth 8. Part of both the pinion shaft 5 and the rack shaft 9 are housed inside a housing 11.

The housing 11, which is a member of the steering gear unit 6, comprises a main housing section 12 and a sub housing section 13, which are both cylindrical in shape. The main housing section 12 is open on both ends, and the sub housing section 13 is provided on the side of part of the main housing section 12, and one end is open. The center axis of the main housing section 12 and the center axis of the sub housing section 13 are in a twisted position against one another.

The rack shaft 9 is inserted through the main housing section 12 so as to be able to displace in the axial direction, and both end sections thereof protrude from the main housing section 12. The tip end half of pinion shaft 5 where the pinion teeth 8 are formed is supported on the inside of the sub housing section 13 so that only rotation is possible. In order for this, the other end of the pinion shaft 5 (left end in FIG. 8) is supported by the back end section of the sub housing section 13 by way of a radial needle bearing 14. Moreover, the middle section of the pinion shaft 5 is supported by a deep-groove, a three point contact or a four point contact single-row ball bearing 15 in the portion near the opening of the sub housing section 13. Of the inner ring 16 and the outer ring 17 of the ball bearing 15, the inner ring 16 is held between an inner-diameter side stepped surface 18 that is formed in the middle section of the pinion shaft 5 and a conical shape snap ring 19 that is fastened to the middle section of the pinion shaft 5. Moreover, the outer ring 17 is held between an outer-diameter side stepped surface 20 that is formed in the middle section of the inner circumferential surface of the sub housing section 13 and a locking screw cylinder 21 that is screwed onto the opening section of the sub housing section 13. With this construction, the tip end half section of the pinion shaft 5 is supported inside the sub housing section 13 so that radial loads and thrust loads can be supported, and so that displacement in the axial direction is prevent and only rotation is possible. In this way, it is possible to maintain the engaging section between the rack teeth and the pinion teeth in the proper state of engagement, and it is possible to prevent the occurrence of strange noise in the engaging section.

During operation of this kind of rack and pinion steering gear unit 6, a force is applied to the rack shaft 9 in a direction away from the pinion shaft 5 due to a reaction force that occurs in the engaging section between the pinion teeth 8 and the rack teeth 10. Therefore, a mechanism for supporting the rear surface side of the rack shaft 9 is provided on the opposite side from the engaging section between the pinion teeth 8 and the rack teeth 10, which prevents displacement of the rack shaft 9 in a direction away from the pinion shaft 5.

As this kind of mechanism, a cylinder section 22 is provided in the housing 11 in the portion on the opposite side of the sub housing section 13 in the diametrical direction of the main housing section 12, and a slide type rack guide 23 is provided inside this cylinder section 22. This slide type rack guide 23 is mounted inside the cylinder section 22, and comprises a pressure block 24 that has a partial cylindrical concave surface that corresponds to the shape of the back surface of the rack shaft 9 on side that presses the rack shaft 9, a cover 25 that is screwed onto the opening section of the cylinder section 22, and screw threads that are formed between the pressure block 24 and the cover 25, and the pressure block 24 is constructed so as to press toward the rack shaft 9.

With this construction, together with eliminating backlash in the engaging section between the pinion teeth 8 and the rack teeth 10, it is possible to maintain the engaging section between the pinion teeth 8 and the rack teeth 10 is a proper state of engagement regardless of the force that is applied to the rack shaft in a direction away from the pinion shaft 5 as power is transmitted at the engaging section between the pinion teeth 8 and the rack teeth 10.

In the case of this kind of steering apparatus, in order to support the tip end half section of the pinion shaft 5 of the rack and pinion gear unit 6 inside the sub housing section 13 so that radial loads and thrust loads can be supported, the locking screw cylinder 21 is screwed onto the opening section of the sub housing section 13, which regulates the displacement on the axial direction of the outer ring 17 of the ball bearing 15. Therefore, it is possible to increase rigidity against thrust loads that try to cause the pinion shaft 5 to displace in the axial direction. However, by simply providing this locking screw cylinder 21, the dimension in the axial direction of the housing 11 increases, so there is a possibility that the size of the steering gear unit 6 will increase. Moreover, the work of assembling this locking screw cylinder 21 is troublesome, and there is a possibility that the production cost will increase.

JP 2010-38254 (A) discloses construction of a rack and pinion gear unit that uses a tapered snap ring such as illustrated in FIG. 9 instead of the locking screw cylinder 21 having the construction illustrated in FIG. 8. In this rack and pinion gear unit 6a, a plurality of conical shaped protrusions 46, which protrude from the inclined side surface 30 that is formed in the portion near the outside end in the radial direction of one side surface in the axial direction of the tapered snap ring 28, are formed at evenly space positions in the circumferential direction of that inclined side surface 30. Moreover, a ring shaped concave groove 47 is formed in an inclined groove side surface 32 of one side surface in the axial direction of the inside surfaces of a ring shaped locking groove 27 that is formed around the inner circumferential surface of the housing 11 for locking the tapered snap ring 28. In the case of this kind of construction, when the tapered snap ring 28 contracts a specified amount due to the radial component of a reaction force from the inclined groove side surface 32 of the locking groove 27 in reaction to an outward force (thrust load) in the axial direction that is applied to the tapered snap ring 28, the protrusions 46 of the tapered snap ring 28 engage with the inner wall surface (inside surface in the radial direction) of the ring shaped concave groove 47. In this way, by being able to prevent the tapered snap ring 28 from contracting more than a specified amount, and stabilizing the locked state between the tapered snap ring 28 and locking groove 27, movement in the axial direction of the tapered snap ring 28 is regulated. With this kind construction, the dimension in the axial direction of the housing 11 does not increase, and the work of assembling and locking the tapered snap ring 28 in the locking groove 27 is not troublesome. However, there is a problem in that the shape of the tapered snap ring 28 and the locking groove 27 that is formed around the inner circumferential surface of the housing 11 is complicated, so there is processing is difficult and thus the manufacturing cost increases.

RELATED LITERATURE

Patent Literature

[Patent Literature 1] JP 2009-184591 (A)
[Patent Literature 2] JP 2004-17872 (A)
[Patent Literature 3] JP 61-124471 (U)
[Patent Literature 4] JP 2010-38254 (A)

SUMMARY OF THE INVENTION

Problem to be Solved by the Invention

Taking the situation above into consideration, the object of the present invention is to provide construction for fastening a bearing that supports thrust loads to a member of a mechanical apparatus such as a housing or a shaft using a tapered snap ring, and more particularly, construction for fastening a bearing in a rack and pinion steering gear unit such that there is high rigidity against thrust loads (load that causes the pinion shaft of a steering gear unit to displace in the axial direction), there is no increase in the dimension in the axial direction, and such that the assembly work is simple; and relates to a steering gear unit that comprises this kind of construction.

Means for Solving the Problems

The present invention relates to construction for fastening a bearing comprising:
a member of a mechanical apparatus;
a bearing that fits with the member and supports thrust loads;
a tapered snap ring for fastening one ring of the bearing that is fitted with the member to the member; and
a ring-shaped locking groove that is formed in the member and that is for locking the tapered snap ring.

Particularly, in the construction for fastening a bearing of the present invention, the tapered snap ring has a thickness in the axial direction and comprises: a side surface on one side (one side surface) in the axial direction that has an inclined side surface on the side that is locked in the locking groove, the inclined side surface being inclined in a direction such that the thickness in the axial direction of the tapered snap ring becomes smaller going to the locking groove side; and a side surface on the other side (the other side surface) in the axial direction that comes in contact with a side surface on one side (one side surface) in the axial direction of the one ring of the bearing and is constructed by an orthogonal side surface that is orthogonal to the center axis of the bearing.

Moreover, the locking groove comprises: a side surface on one side (one side surface) in the axial direction that has an inclined groove side surface that is inclined in the same direction as the inclined side surface of the tapered snap ring; and a side surface on the other side (the other side surface) in the axial direction having an orthogonal groove side surface that is orthogonal to the center axis of the bearing.

In the construction for fastening a bearing of the present invention, the one ring is positioned on the member so that the length in the axial direction between the circumferential edge of the one side surface in the axial direction of the locking groove and the one side surface in the axial direction of the one ring is less than the maximum thickness of the tapered snap ring, and in the state wherein the tapered snap ring is locked in the locking groove and the one ring is fastened to the member, a gap in the axial direction is formed between the surface on the other side in the axial direction of the tapered snap ring and the surface on the other side in the axial direction of the locking groove.

Preferably, a ring-shaped protrusion is formed in a position on the other side surface in the axial direction of the tapered snap ring that faces the other side surface in the axial direction of the locking groove, and this ring-shaped protrusion protrudes from the other side surface in the axial direction of the tapered snap ring toward the other side surface in the axial direction of the locking groove.

Preferably, the length in the axial direction of the gap is 0.1 mm or less.

Preferably, the angle between a virtual plane that is orthogonal to the center axis of the bearing and the inclined side surface of the tapered snap ring is greater than the angle between the virtual plane and the inclined groove side surface of the locking groove.

Preferably, a chamfered section is formed in a continuous section between the circumferential surface of the one ring that fits with the member and the one side surface in the axial direction of the one ring, where the radius of curvature of this chamfered section is 0.5 mm or less.

The construction for fastening a bearing of the present invention is preferably applied to a rack and pinion steering gear unit of a steering apparatus for applying a steering angle to the steered wheels of an automobile.

This rack and pinion steering gear unit comprises:
a housing;
a rack shaft that is supported by the housing so as to be able to move back and forth, and that is for changing the steering angle of steered wheels by way of tie rods, and that has rack teeth;
a pinion shaft that is connected to a steering wheel at one end, and that has pinion teeth that engage with the rack teeth of the rack shaft, and that is for transmitting rotation of the steering wheel to the rack shaft;

a first bearing that comprises an outer ring that is fitted into an inner circumferential surface of the housing, and an inner ring that is fitted onto an outer circumferential surface of the middle section of the pinion shaft, and that, with supporting the middle section of the pinion shaft on the housing so as to be able to rotate, supports thrust loads that act on the pinion shaft; and a second bearing that is fitted into the inner circumferential surface of the housing, and that, with supporting the other end of the pinion shaft on the housing so as to be able to rotate, supports radial loads that act on the pinion shaft;

the construction for fastening a bearing of the present invention is applied for fastening the first bearing to the housing or to the middle section of the pinion shaft.

In this case, the housing or the middle section of the pinion shaft corresponds to the member of the mechanical apparatus, and the outer ring of the first bearing in the case that the housing is the member or the inner ring of the first bearing in the case that pinion shaft is the member, corresponds to the one ring.

Effect of the Invention

When the construction for fastening a bearing of the present invention is applied for fastening an outer ring of a first bearing, which is fitted with the middle section of a pinion shaft of a rack and pinion steering gear unit, to the inner circumferential surface of a housing, with a tapered snap ring locked into a locking groove that is formed in the housing and the outer ring of the first bearing fixed to the inner circumferential surface of the housing, by regulating the positions in the axial direction of the outer ring and the locking groove and providing a gap between the surface on the other side in the axial direction of the tapered snap ring and the surface on the other side in the axial direction of the locking groove, the amount that the outside end section in the radial direction of the tapered snap ring enters into the locking groove (the amount of engagement in the radial direction between the tapered snap ring and the locking groove) becomes small. In other words, with the tapered snap ring locked in the locking groove, the tapered snap ring maintains an elastic restoring force in the direction in which the outer diameter becomes large. Therefore, the force by which the inclined side surface of the tapered snap ring presses the inclined groove side surface of the locking groove in the radial direction becomes large, and with respect to this pressing force in the radial direction, the force (reaction force) by which the inclined groove side surface of the locking groove presses back against the tapered snap ring in the axial direction (toward the outer ring side) becomes large. As a result, the force by which the orthogonal side surface of the tapered snap ring presses the one side surface in the axial direction of the outer ring toward the other side in the axial direction becomes large, and thus it becomes possible to stably support large thrust loads that act on the first bearing.

Moreover, as the tapered snap ring inclines due to a large thrust load that acts on the first bearing, part of the other side surface in the axial direction of the tapered snap ring comes in contact with the other side surface in the axial direction of the locking groove, and thus the inclination of the tapered snap ring is regulated. Therefore, the engagement between the tapered snap ring and the locking groove is prevented from coming apart, and thus it is possible to stabilize the state of engagement between the tapered snap ring with respect to the locking groove. As a result, it is possible to more surely prevent displacement of the first bearing in the axial direction, and it is possible to properly maintain the state of the engagement between the pinion teeth and the rack teeth.

BRIEF DESCRIPTION OF THE DRAWINGS

FIG. 2A is an enlarged view of part A in FIG. 1, and illustrates the state before a thrust load acts on the pinion shaft, and FIG. 2B is an enlarged view of part A in FIG. 1, and illustrates the state when a thrust load is applied to the pinion shaft.

MODES FOR CARRYING OUT THE INVENTION

In the following, several examples of embodiments of construction for fastening a bearing of the present invention will be explained in detail with reference to the drawings, using the case of a rack and pinion type steering gear unit and applying the invention to fastening the outer ring of a first bearing that is fitted in the middle section of a pinion shaft to the inner circumferential surface of a housing as an example.

Example 1

Figure 1:
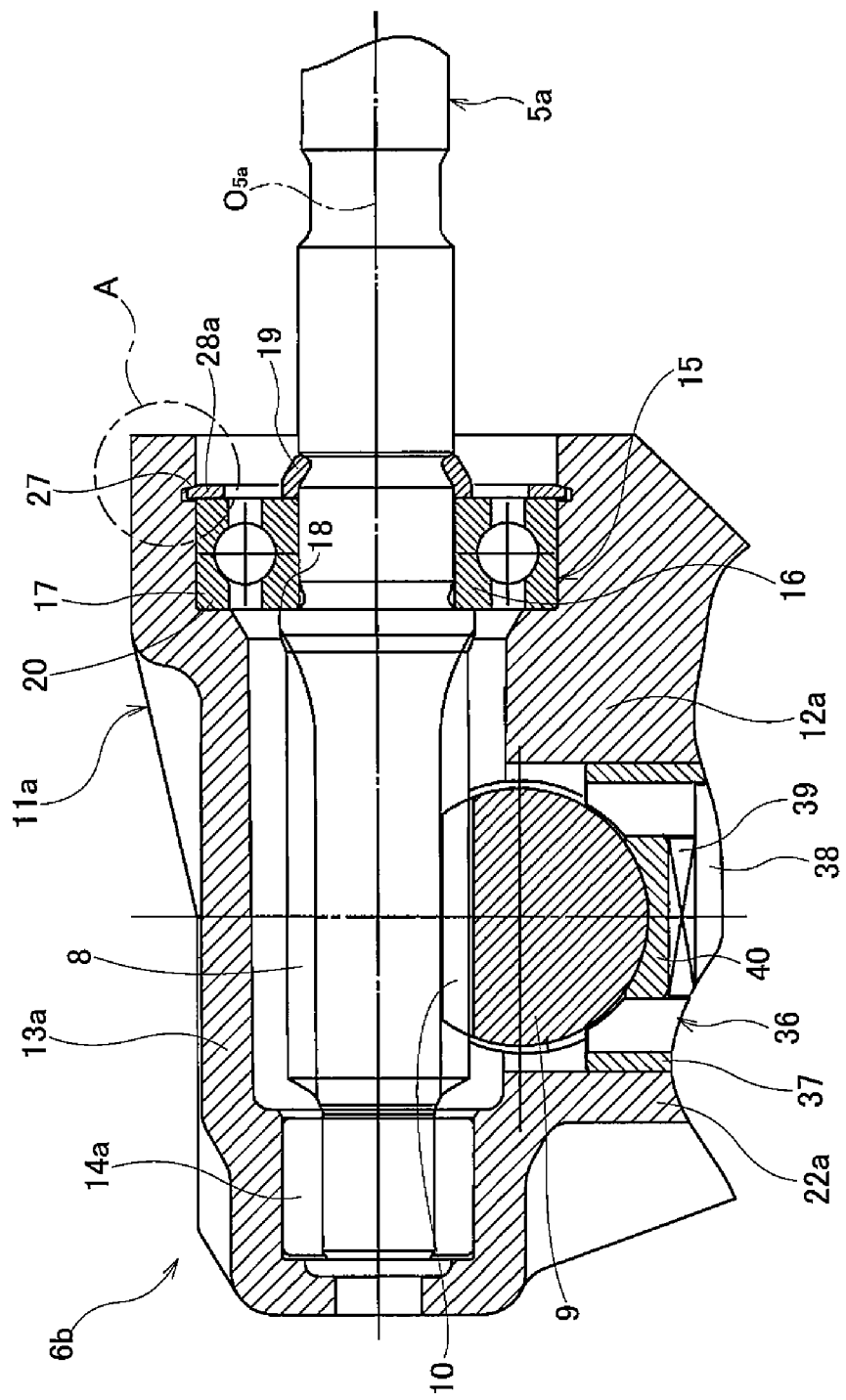
FIG. 1 illustrates a first example of an embodiment of the present invention, and is a drawing that corresponds to section Y-Y in FIG. 7.
Figure 3:
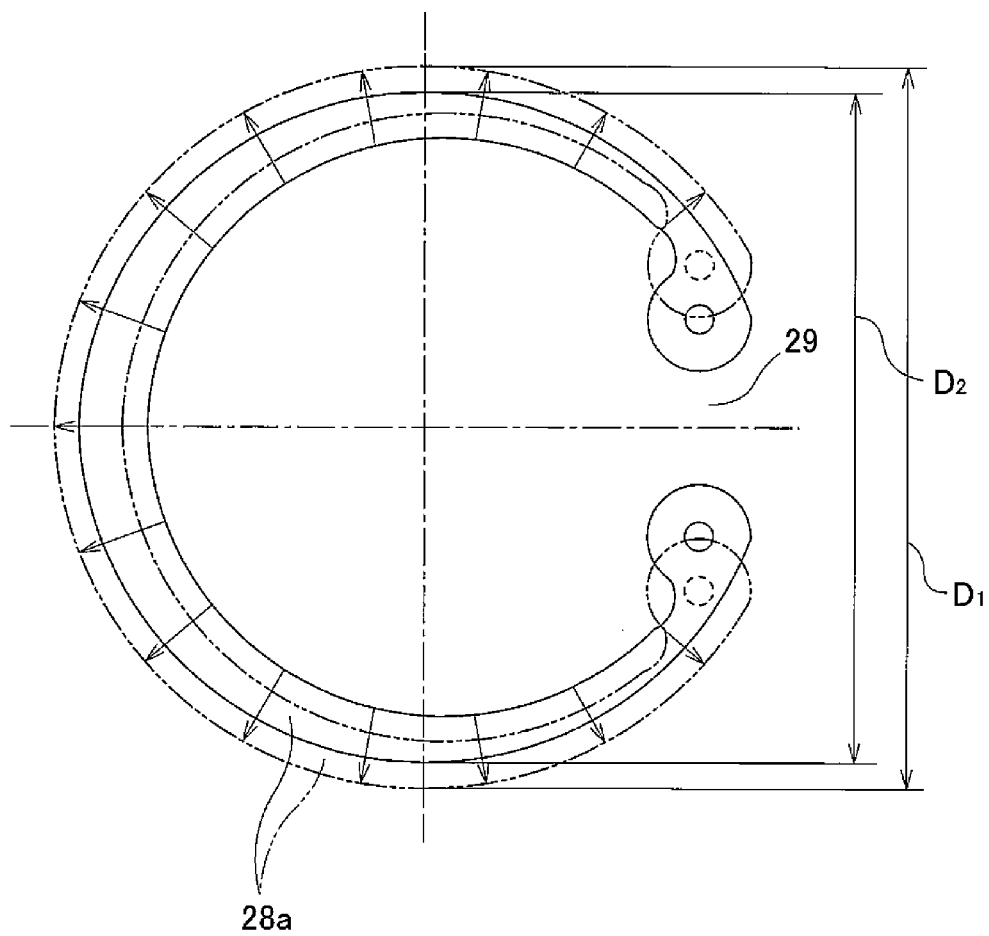
FIG. 3 is s top view wherein the dashed lines illustrate the free state of the tapered snap ring, and the solid lines illustrate the state of the tapered snap ring when locked in the locking groove.

FIG. 1 to FIG. 3 illustrate a first example of an embodiment of the present invention. A feature of the present invention is construction devised for fastening a bearing to a component member such as a housing using a tapered snap ring in a mechanical apparatus such as a rack and pinion steering gear unit. As long as the invention can be applied, conventionally known construction can be used for the construction of the other parts of a mechanical apparatus that includes a steering gear unit.

The rack and pinion steering gear unit 6b of this example is such that the tip end half of a pinion shaft 5a is supported on the inside of a sub housing section 13a of a housing 11 so as to be able to rotate. In order for this, the other end of the pinion shaft 5a (left end in FIG. 1) is supported by the back end section of the sub housing 13a by way of a radial needle bearing 14a as a second bearing. Moreover, the middle section of the pinion shaft 5a is supported by the portion near the opening of the sub housing section 13a by a deep-groove, three point contact or four point contact single-row ball bearing 15 as a first bearing. The ball bearing 15 comprises an inner ring 16 and outer ring 17 as bearing rings, and the outer ring 17 corresponds to one ring of the bearing rings. The inner ring 16, which corresponds to the other ring of the bearing rings, is held between an inner-diameter side stepped surface 18 that is formed around the middle section of the pinion shaft 5a and a conical shaped snap ring 19 that is fastened in the middle section of the pinion shaft 5a.

Particularly, in this example, the outer ring 17, which is one ring, is held between an outer-diameter stepped surface 20 that is formed around the middle section of the inner circumferential surface of the sub housing section 13a, and a tapered snap ring 28a that is fastened to a locking groove 27 that is formed around the inner circumferential surface of the sub housing section 13a that is further to one side (right side in FIG. 1) than the outer-diameter stepped surface 20. In this way, displacement in the axial direction of the outer ring 17 is regulated.

The tapered snap ring 28a is made using an elastic material such as carbon steel or carbon tool steel, and as illustrated in FIG. 3, is a partial ring shape having a non-continuous section 29 in one part in the circumferential direction. Moreover, the tapered snap ring 28a has a specified thickness in the axial direction (about 1 mm to 5 mm in the case of a typical rack and pinion steering gear unit for an automobile), and in a portion from the middle section in the radial direction of one side surface (right side surface in FIG. 1 and FIG. 2) in the axial direction of the tapered snap ring 28a to the outer end section in the radial direction, an inclined side surface 30a that is inclined in a direction such that the thickness becomes smaller in the axial direction (left-right direction in FIG. 1 and FIG. 2) going toward the outside in the radial direction (up-down direction in FIG. 1 and FIG. 2). In other words, this inclined side surface 30a is inclined in a direction such that the thickness in the axial direction becomes smaller going toward the locking groove 27 side. Furthermore, this inclined side surface 30a forms an angle $\alpha_{30}$ with respect to a virtual plane β (indicated by a chain line β in FIG. 2) that is orthogonal to the center axis $O_{5a}$ of the pinion shaft 5a (indicated by a chain line $O_{5a}$ in FIG. 1). The center axis $O_{5a}$ of the pinion shaft 5a is also the center axis of the ball bearing 15. On the other hand, the other side surface in the axial direction of the tapered snap ring 28a is an orthogonal side surface 31 that is orthogonal to the center axis $O_{5a}$ of the pinion shaft 5a.

The locking groove 27 that is formed around the inner circumferential surface of the sub housing section 13a of the housing 11a has a specified width in the axial direction. The inside surfaces of the locking groove 27 comprise ring-shaped concave groove construction where one side surface in the axial direction is an inclined groove side surface 32a that is inclined in the same direction as the inclined side surface 30a of the tapered snap ring 28 (direction in which the dimension in the axial direction of the locking groove becomes smaller going toward the outside in the radial direction). Furthermore, an angle $\alpha_{32a}$ is formed between this inclined groove side surface 32a and the virtual plane β that is orthogonal to the center axis line $O_{5a}$ of the pinion shaft 5a. In this example, the angle $\alpha_{30a}$ between the inclined side surface 30a of the tapered snap ring 28a and the virtual plane β, and the angle $\alpha_{32a}$ between the inclined groove side surface 32a of the locking groove 27 and the virtual plane β are the same ($\alpha_{30a}=\alpha_{32a}$). On the other hand, of the inside surface of the locking groove 27, the other side surface in the axial direction is an orthogonal side surface 33 that is orthogonal to the center axis line $O_{5a}$ of the pinion shaft 5a.

With this kind of tapered snap ring 28a elastically deformed in a direction such that the outer diameter is reduced, it is inserted from one opening in axial direction of the sub housing section 13a of the housing 11a into the inner-diameter side of the sub housing section 13a and locked into the locking groove 27.

Here, in this example, as illustrated in FIG. 2A, the outer ring 17, which is one ring, is positioned with respect to the sub housing section 13a so that the length $L_{27}$ in the axial direction between the inner circumferential edge of the inclined groove side surface 32a, which is one side surface in the axial direction of the locking groove 27, and one side surface 34 (right side surface in FIG. 1 and FIG. 2) in the axial direction of the outer ring 17 is less then the thickness $T_{28a}$ in the axial direction of the inside end section in the radial direction of the inclined side surface 30a of the tapered snap ring 28a, which is the maximum thickness of the tapered snap ring 28a, ($L_{27}<T_{28a}$). In other words, when the tapered snap ring 28a is locked into the locking groove 27, the position in the axial direction of the one side surface 34 in the axial direction of the outer ring 17 is offset to one side in the axial direction further than the position in the axial direction of the orthogonal groove side surface 33, which is the other side surface in the axial direction of the locking groove 27.

With the orthogonal side surface 31, which is the other side surface in the axial direction of the tapered snap ring 28a, in contact with the one side surface 34 in the axial direction of the outer ring 17, and with the inclined side surface 30a of the tapered snap ring 28a in contact with the inclined groove side surface 32a of the locking groove 27, the portion near the outside end in the radial direction of the tapered snap ring 28a is locked in the locking groove 27. As illustrated in FIG. 3, the outer diameter dimension $D_2$ of the tapered snap ring 28a in the locked state (state illustrated by the solid line in FIG. 3) is less than the outer diameter dimension $D_1$ in the free state (state illustrated by the 2-dot chain line in FIG. 3) ($D_1>D_2$). Therefore, in this locked state, the tapered snap ring 28a maintains an elastic restoring force in the direction for the outer diameter thereof to become greater.

With the outer ring 17 fastened to the sub housing section 13a of the housing 11a by locking the tapered snap ring 28a in the locking groove 27, a gap 35 is formed in the axial direction between the orthogonal groove side surface 33 of the locking groove 27 and the other side in the axial direction of the tapered snap ring 28a. In this example, the length $L_{35}$ in the axial direction of this gap 35 is 0.1 mm or less. In other words, the outer ring 17 is offset by an amount of 0.1 mm or less in one direction in the axial direction of the one side surface 34 in the axial direction with respect to the orthogonal groove side surface 33, which is the one side surface in the axial direction of the locking groove 27.

In this example when the steering gear unit 6b is operating, in order to suppress displacement of the rack shaft 9 in the direction going away from the pinion shaft 5a, a rolling rack guide is provided as a mechanism (rack guide) for supporting the back surface side of the rack shaft 9, which is the opposite side from the engaging section between the pinion teeth 8 and the rack teeth 10.

A cylinder section 22a is provided in the housing 11a in the portion on the opposite side from the sub housing section 13a in the radial direction of the main housing section 12a, and a rolling rack guide 36 is provided inside the cylinder section 22a. This rolling rack guide 36 elastically compresses and holds a force applying member (not illustrated in the figure), which is made of an elastic material such as a spring, between a cylindrical adjustment screw with a base that is screwed onto the tip end section (bottom end section in FIG. 1) of the cylinder section 22a of the housing 11a and a retaining cylinder 37 that is mounted on the inner-diameter side of the cylinder section 22a such that displacement in the axial direction is possible. Moreover, the outer circumferential surface of a roller 40, which is supported around a support shaft 38 that is provided on the inner-diameter side of the retaining cylinder 37 by way of a radial needle bearing 39 so as to be able to rotate freely, comes in rolling contact with the back surface of the rack shaft 9 and presses this back surface by the elastic force of the force applying member.

In this example, the position in the axial direction of the one side surface 34 in the axial direction of the outer ring 17 is offset in one direction in the axial direction further than the position in the axial direction of the orthogonal groove side surface 33 of the locking groove 27, and the outer ring 17 is positioned with respect to the sub housing section 13a so that the length $L_{27}$ in the axial direction between the inclined groove side surface 32a of the locking groove 27 is less than the thickness $T_{28a}$ in the axial direction on the inside end section in the radial direction of the inclined side surface 30a of the tapered snap ring 28a ($L_{27} < T_{28a}$). With the tapered snap ring 28a locked in the locking groove 27 that is formed around the housing 11a, and the outer ring 17 fastened to the inner circumferential surface of the sub housing section 13a, a gap 35 is provided between the orthogonal side surface 31 of the tapered snap ring 28a and the orthogonal groove side surface 33 of the locking groove 27. In this kind of construction, as illustrated in FIG. 2, the amount $L_{28a}$ that the portion of the tapered snap ring 28a near the outside end in the radial direction is inserted into the locking groove 27 is smaller than in the case of the conventional construction. In other words, when the tapered snap ring 28a locked in the locking groove 27, the tapered snap ring 28a maintains the elastic restoring force in the direction that outer diameter becomes large. Therefore, the force by which the inclined side surface 30a of the tapered snap ring 28a presses the inclined groove side surface 32a of the locking groove outward in the radial direction becomes large, and the force (reaction force in the axial direction) by which the inclined groove side surface 32a of the locking groove 27 presses back the tapered snap ring 28a toward the other direction in the axial direction (outer ring 17 side) also becomes large. As a result, force by which the orthogonal side surface 31 of the tapered snap ring 28a presses the one side surface 34 in the axial direction of the outer ring 7 toward the other side in the axial direction becomes large, and it becomes possible to stably support a thrust load toward the one side in the axial direction that acts on the ball bearing 15 as indicated by the arrow P in FIG. 2B.

Moreover, as illustrated in FIG. 2B, a large thrust load is applied in the direction of arrow P, and when the tapered snap ring 28a inclines, the orthogonal side surface 31, which is the surface on the other side in the axial direction of the tapered snap ring 28a, comes in contact with the orthogonal groove side surface 33, which is the surface on the other side in the axial direction of the locking groove 27, which restricts inclination of the tapered snap ring 28a. Therefore, the engagement between the tapered snap ring 28a and the locking groove 27 is prevented from coming apart, and thus it is possible to stabilize the engagement of the tapered snap ring 28a in the locking groove 27. As a result, displacement in the axial direction of the ball bearing can be more certainly prevented, and it is possible to properly maintain the engaged state between the pinion teeth 8 and the rack teeth 10.

Moreover, in this example, the position in the axial direction of the orthogonal groove side surface 33 of the locking groove 27 is regulated by the relationship with the one side surface 34 in the axial direction of the outer ring 17, and the shape and placement of the locking groove 27 only need be regulated so that the length $L_{27}$ in the axial direction between the one side surface in the axial direction of the outer ring 17 and the inner circumferential edge (inside end in the radial direction) of the inclined groove side surface 32a, which is the one side surface in the axial direction of the locking groove 27, is less than the thickness dimension $T_{28a}$ in the axial direction of the portion on the inside end in the radial direction of the inclined side surface 30a of the tapered snap ring 28a. Therefore, when compared with the conventional construction, it is possible to suppress processing costs and reduce manufacturing costs.

Example 2

Figure 4:
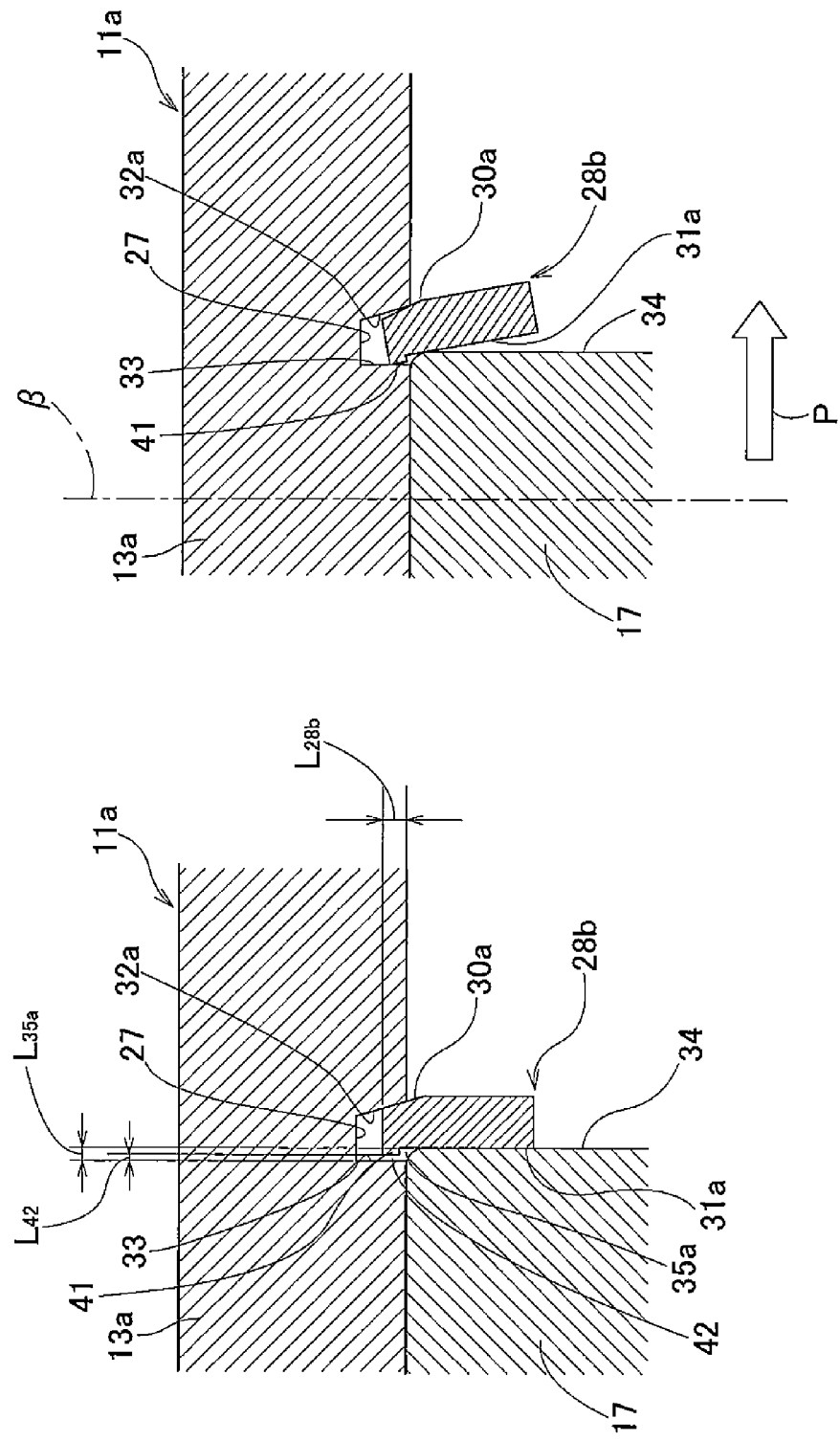
FIGS. 4A and 4B are drawing similar to FIG. 2, and illustrate a second example of an embodiment of the present invention.

FIG. 4 illustrates a second example of an embodiment of the present invention. In the rack and pinion steering gear unit of the steering apparatus of this example, a ring-shaped protrusion 41 is formed around the entire circumference of the tapered snap ring 18b on the outside end section (left end section in FIG. 4) in the radial direction of the orthogonal side surface 31a of the other side surface in the axial direction of the tapered snap ring 28b (left side in FIG. 4) that faces the orthogonal groove side surface 33, which is the other side surface in the axial direction of the locking groove 27 so as to protrude to the other side in the axial direction from the orthogonal side surface 31a. The other shape of the tapered snap ring 28b is the same as the shape of the tapered snap ring 28a of the first example of the embodiment. Moreover, the construction of the locking groove 27 that is formed around the inner circumferential surface of the sub housing section 13a of the housing 11a is the same as in the first example of the embodiment.

After this tapered snap ring 28b has been elastically deformed in a direction that reduces the outer diameter, it is inserted from the one opening in the axial direction of the sub housing section 13a of the housing 11a into the inner-diameter side of the sub housing section 13a, and is locked in the locking groove as illustrated in FIG. 4A.

In the state illustrated in FIG. 4A where the tapered snap ring 28b is locked in the locking groove 27, the length $L_{35a}$ in the axial direction of a gap 35a between the orthogonal groove side surface 33 of the locking groove 27 and the portion of the orthogonal side surface 31a of the tapered snap ring 28b other than where the ring-shaped protrusion 41 is formed is 0.1 mm or less, which is the same as in the first example of the embodiment. Moreover, the length $L_{42}$ in the axial direction of a gap 42 between the orthogonal groove side surface 33 of the locking groove 27 and the tip end (left end in FIG. 4) of the ring-shaped protrusion 41 of the tapered snap ring 28b is less than the dimension $L_{35a}$ in the axial direction of the gap 35a ($L_{42} < L_{35a}$). More specifically, when the length $L_{35a}$ in the axial direction of the gap 35a is 0.1 mm, the protruding amount of the ring-shaped protrusion 41 is taken to be 0.05 mm, and the length $L_{42}$ in the axial direction of the gap 42 is taken to be 0.05 mm.

Figure 6:
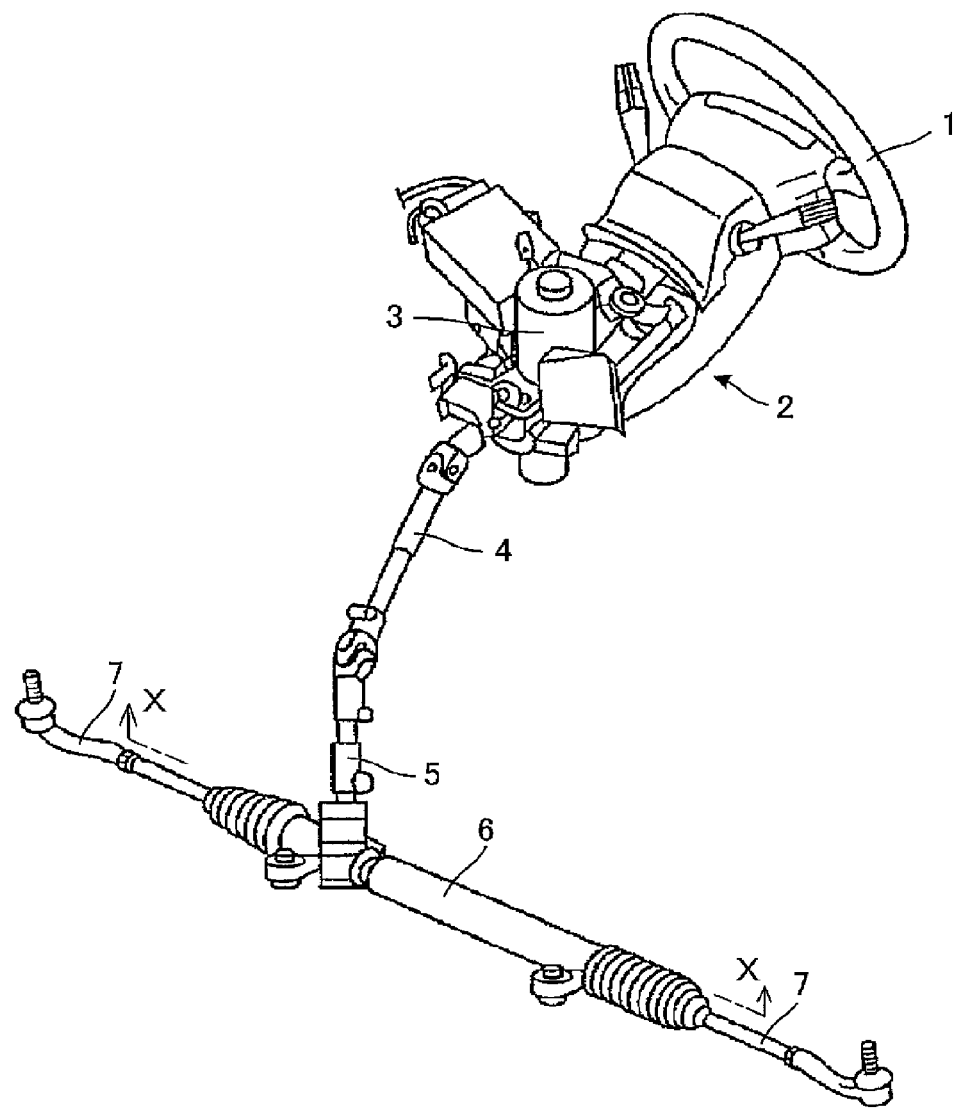
FIG. 6 is a perspective drawing illustrating an example of conventional construction of a steering apparatus that comprises a rack and pinion steering gear unit.
Figure 7:
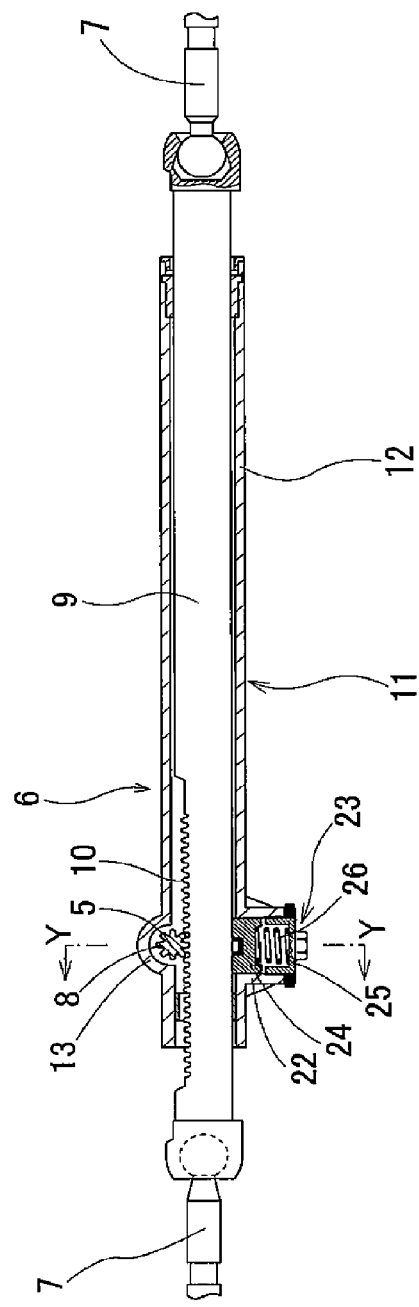
FIG. 7 illustrates an example of conventional construction of a steering gear unit, and corresponds to section X-X in FIG. 6.
Figure 8:
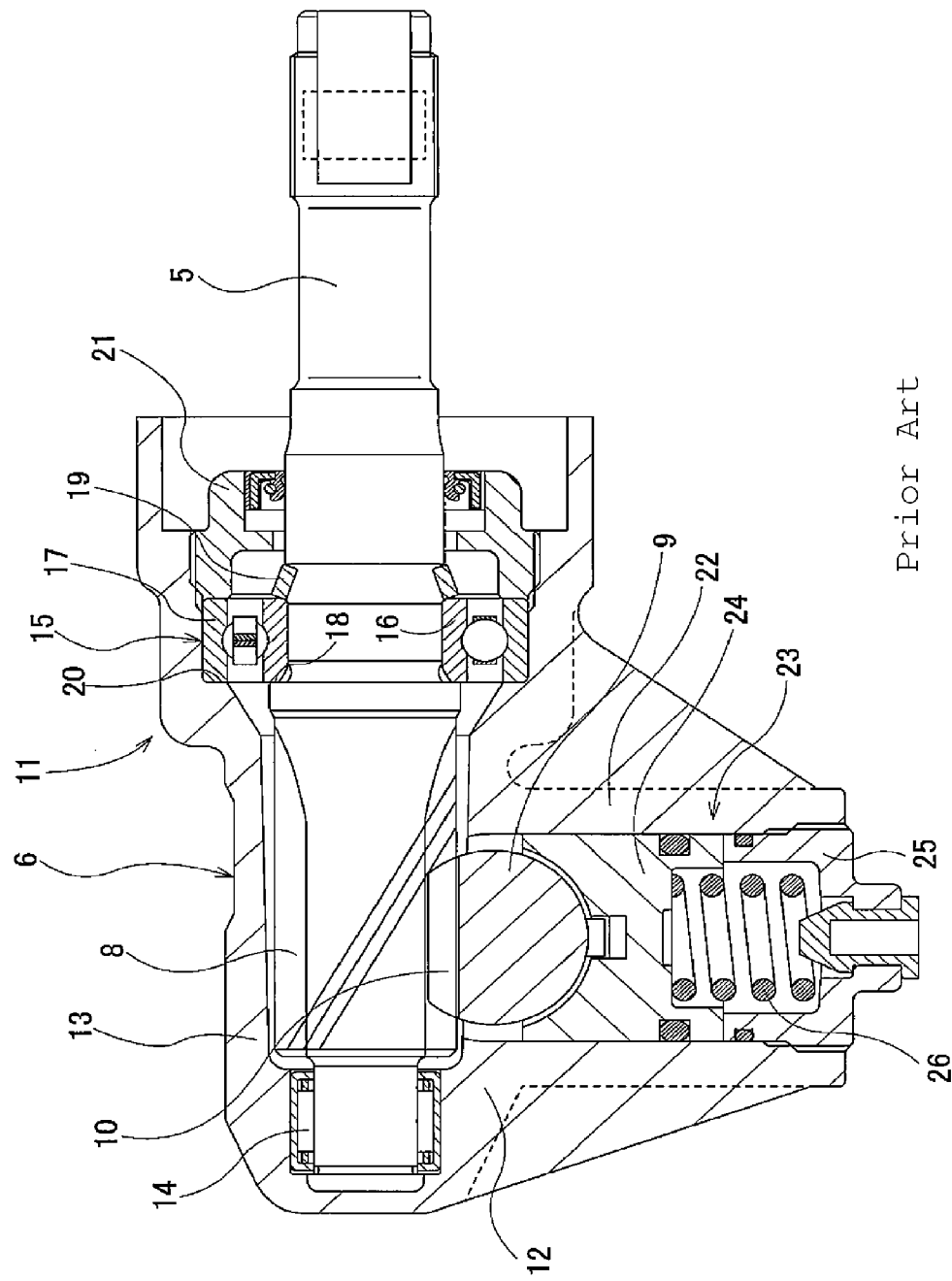
FIG. 8 is a cross-sectional view of section Y-Y in FIG. 7.
Figure 9:
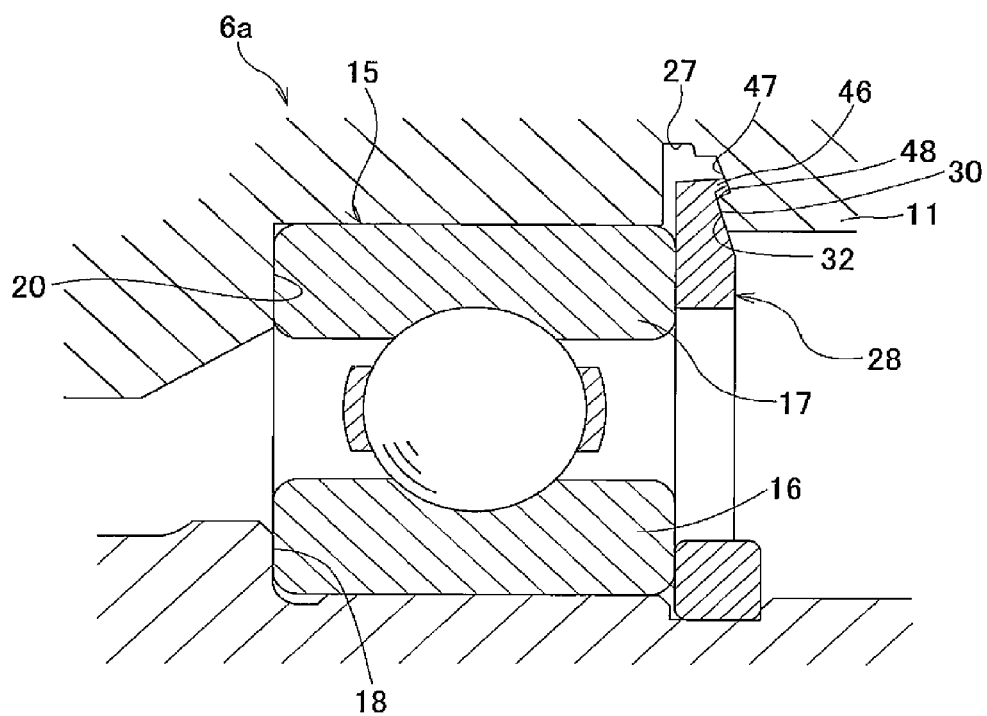
FIG. 9 illustrates an example of conventional construction of a steering gear unit when construction of installing a bearing using a tapered snap ring is applied.

In this case, the ring-shaped protrusion 41 is formed on the outside end section in the radial direction of the orthogonal side surface 31a of the tapered snap ring 28b. Therefore, when a large thrust load is applied to the ball bearing 15 in the direction of arrow P and the tapered snap ring 28b inclines as illustrated in FIG. 4B, the inclination angle of the tapered snap ring 28b with respect to an virtual plane β that is orthogonal to the center axis $O_{5a}$ (see FIG. 6) of the pinion shaft 5a is smaller than in the case of the first example of the embodiment, and the tip end of the ring-shaped protrusion 41 comes in contact with the orthogonal groove side surface of the locking groove 27. Therefore, it is possible to more certainly prevent the engagement between the tapered snap ring 28b and the locking groove 27 from coming apart, and thus it is possible to stabilize the engaged state of the tapered snap ring 28b with respect to the locking groove 27. As a result, it is possible to more surely prevent displacement in the axial direction of the ball bearing 15 and to properly maintain the engaged state between the pinion teeth 8 and the rack teeth 10. The construction and functions of the other parts of this second example are the same as in the first example of the embodiment.

Example 3

Figure 5:
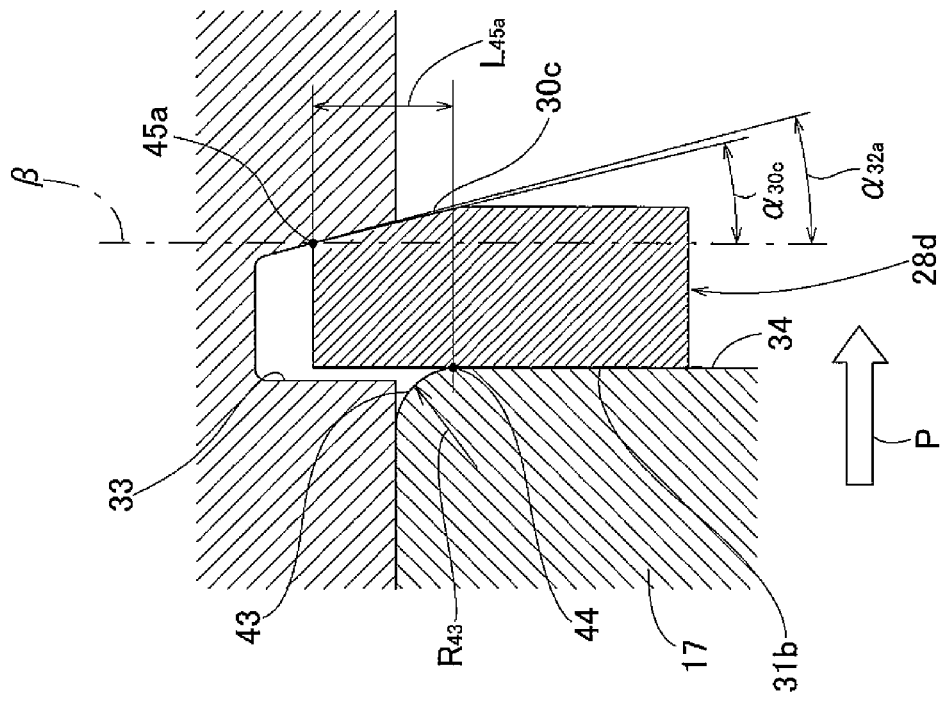
FIG. 5A is a drawing similar to FIG. 2A, and illustrates a third example of an embodiment of the present invention.
FIG. 5B is a drawing similar to FIG. 2B, and illustrates a comparative example for comparison with the third example of an embodiment of the present invention.
Figure 5:
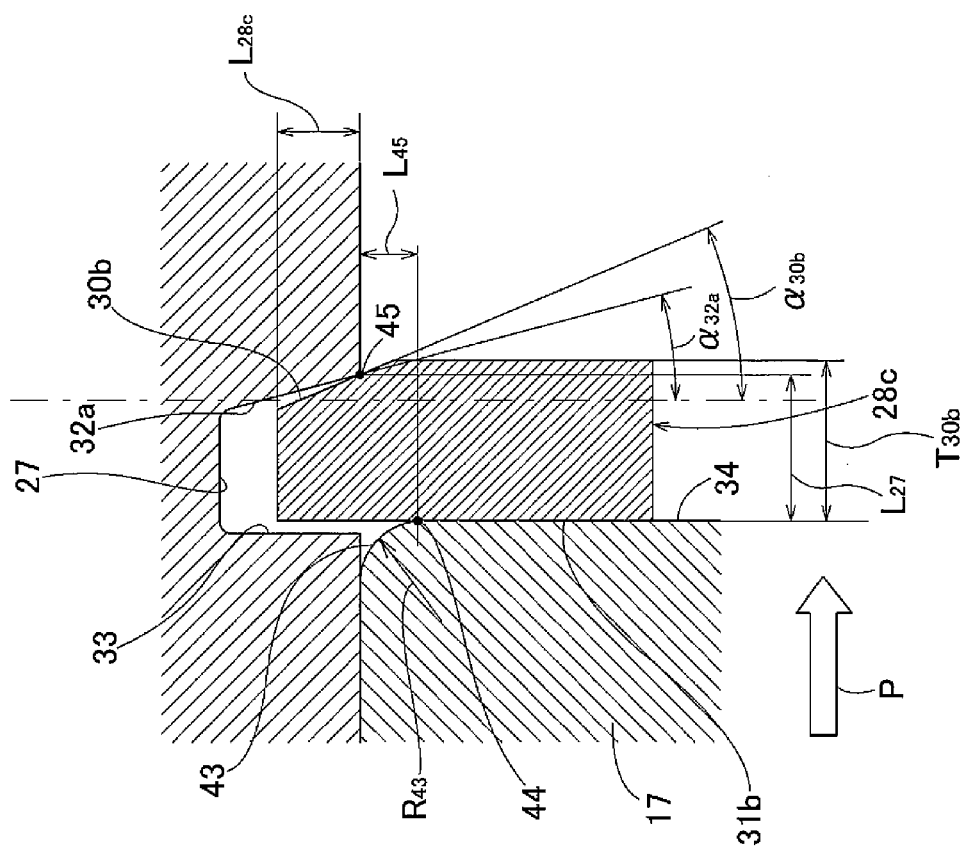

FIG. 5A illustrates a third example of an embodiment of the present invention. The rack and pinion steering gear unit of this example is such that the angle $\alpha_{30b}$ between the inclined side surface 30b of the tapered snap ring 28c and an virtual plane β that is orthogonal to the center axis $O_{5a}$ (see FIG. 1) of the pinion shaft 5a is greater than the angle $\alpha_{32a}$ between the inclined groove side surface 32a of the locking groove 27 and the virtual plane β ($\alpha_{30b} > \alpha_{32a}$).

In a state where the tapered snap ring 28c of this example is locked in the locking groove 27, the position in the axial direction of the one side surface 34 of the outer ring 17 is offset to one side in the axial direction more than the position in the axial direction of the orthogonal groove side surface 33 of the other side surface in the axial direction of the inside surfaces of the locking groove 27. As a result, the length $L_{27}$ in the axial direction between the one side surface 34 in the axial direction of the outer ring 17 and the inner circumferential edge (inside end in the radial direction) of the inclined groove side surface 32 of the one side surface of the locking groove 27 is less than the thickness dimension $T_{30b}$ in the axial direction of the portion on the inside end section in the radial direction of the inclined side surface 30b of the tapered snap ring 28c, which is the maximum thickness of the tapered snap ring 28c ($L_{27} < T_{30b}$). Moreover, a chamfered section 43 is formed in the continuous section between the outer circumferential surface of the outer ring 17 and the one side surface 34 in the axial direction of the outer ring 17. The radius of curvature $R_{43}$ of this beveled section 43 is preferably 0.5 mm or less ($R_{43} \leq 0.5$ mm). The other construction is the same as in the first example.

In this example, the angle $\alpha_{30b}$ between the inclined side surface 30b of the tapered snap ring 28c and the virtual plane β and the angle $\alpha_{32a}$ between the inclined groove side surface 32a of the locking groove 27 and the virtual plane β are regulated such that the relationship between them is $\alpha_{30b} > \alpha_{32a}$. Moreover, the length $L_{27}$ in the axial direction between the one side surface 34 in the axial direction of the outer ring 17 and the inside end in the radial direction of the inclined groove side surface 32a of the locking groove 27 and the thickness dimension $T_{30b}$ in the axial direction of the portion on the inside end section in the radial direction of the inclined side surface 30b of the tapered snap ring 28c are regulated such that the relationship between them is $L_{27} < T_{30b}$. Therefore, the position of engagement between the inclined side surface 30b of the tapered snap ring 28c and the inclined groove side surface 32a of the locking groove 27 can be located on or near the edge on the inside end in the radial direction of the inclined groove side surface 32 of the locking groove 27 as illustrated in FIG. 5A.

Consequently, in this example, it is possible to reduce the distance $L_{45}$ in the radial direction between the contact point 44 (point of action) between the one side surface 34 in the axial direction of the outer ring 17 and the orthogonal side surface 31b of the tapered snap ring 28c and the position of engagement 45 (point of support) between the inclined side surface 30b of the tapered snap ring 28c and the inclined groove side surface 32a of the locking groove 27. Therefore, even when a thrust load is applied to the outer ring 17 in the direction indicated by arrow P in FIG. 5A, the moment applied to the tapered snap ring 28c due to this thrust load becomes small. As a result, together with being able to improve the durability of the tapered snap ring 28c, it is possible to improve the stability of the locked state of the tapered snap ring 28c with respect to the locking groove 27. By making the radius of curvature $R_{43}$ of the chamfer in the continuous section between the outer circumferential surface of the outer ring 17 and the one side surface 34 in the axial direction of the outer ring 17, 0.5 mm or less, the contact point 44 (point of action) between the one side surface 34 in the axial direction of the outer ring 17 and the orthogonal side surface 31b of the tapered snap ring 28c is further shifted outward in the radial direction, and so it is possible to further reduce the distance $L_{45}$ in the radial direction between the contact point 44 (point of action) and the engagement position 45 (point of support).

As a comparative example for comparing the construction and effect of this example, construction is illustrated in which the relationship between the angle $\alpha_{30c}$ between the inclined side surface 30c of the tapered snap ring 28a and the virtual plane β and the angle $\alpha_{32a}$ between the inclined groove side surface 32a of the locking groove 27 and the virtual plane β is opposite from that of this example ($\alpha_{30c} < \alpha_{32a}$). In this case, it can be seen that the position of engagement 45a between the inclined side surface 30c of the tapered snap ring 28a and the inclined groove side surface 32a of the locking groove 27 is further outward in the radial direction than in the case of the example illustrated in FIG. 5A Therefore, the distance $L_{45a}$ in the radial direction between the contact point 44 (point of action) between the one side surface 34 in the axial direction of the outer ring 17 and the orthogonal side surface 31b of the tapered snap ring 28c and the engagement position 45a (point of support) between the inclined side surface 30 of the tapered snap ring 28a and the inclined groove side surface 32a of the locking groove 27 becomes greater than the distance $L_{45}$ in the radial direction between the contact point 44 (point of action) and the engagement position 45 (point of support) of the construction illustrated in FIG. 5A ($L_{45a} > L_{45}$).

In this example, by properly regulating the width in the axial direction of the locking groove 27, it is possible in a state in which the tapered snap ring 28c is locked in the locking groove 27, to further reduces the amount $L_{28c}$ that the outside end section in the radial direction of the tapered snap ring 28c is inserted into the locking groove 27 (amount of engagement in the radial direction between the tapered snap ring 28c and the locking groove 27). Therefore, it is possible for the tapered snap ring 28c to maintain a greater elastic restoring force in a direction that increases the outer diameter. Consequently, the force by which the inclined side surface 30b of the tapered snap ring 28c presses the inclined groove side surface 32a of the locking groove outward in the radial direction becomes greater and thus the force (reaction force in the axial direction) by which the inclined groove side surface 32a of the locking groove 27 presses the tapered snap ring 28c back toward the other side in the axial direction (outer ring side) becomes also greater. As a result, the force by which the orthogonal side surface 31b of the tapered snap ring 28c presses the one side surface 34 in the axial direction of the outer ring 17 toward the other side in the axial direction becomes large, and thus it becomes possible to stably support a thrust load toward the one side in the axial direction that acts on the ball bearing 15. The construction and functions of the other parts of this third example of the embodiment are the same as in the first example.

INDUSTRIAL APPLICABILITY

The present invention was explained based on examples of an embodiment of applying the present invention to a rack and pinion steering gear unit that employs the construction for fastening a bearing of the present invention. The steering gear unit to which the present invention is applied is not limited to the column assist rack and pinion power steering apparatus illustrated in FIG. 6, but can also be applied to a pinion assist rack and pinion power steering apparatus, or a manual type rack and pinion steering apparatus.

Moreover, in addition to the housing for the steering gear unit illustrated in the examples, the target member for locking the tapered snap ring of the present invention also includes members of a mechanical apparatus in which particularly the outer ring of a bearing that supports a thrust bearing is fastened to the inner circumferential surface thereof. Furthermore, the target member for locking the tapered snap ring of the present invention includes a shaft member such as a pinion shaft to which the inner ring of a bearing that supports a thrust load is fastened to the outer circumferential surface thereof. In that case, the construction of the locking groove that is formed in the outer circumferential surface of the shaft member and the construction of the tapered snap ring can be opposing in the radial direction from that in the examples of the embodiment above. More specifically, the inclined side surface on one surface in the axial direction of the tapered snap ring is formed in the portion of the tapered snap ring that extends from the middle section in the radial direction of the tapered snap ring to the inside end section in the radial direction. Moreover, the thickness in the axial direction becomes smaller as the direction of inclination of the inclined side surface advances inward in the radial direction. Furthermore, the inclination direction of the inclined groove side surface of the one side surface in the axial direction of the inside surfaces of the locking groove is formed so as to be the same direction as that of the inclined side surface of the tapered snap ring. This kind of tapered snap ring, while in a state of being elastically deformed in a direction such that the outer diameter is expanded, is inserted from the end section of the shaft and locked in the locking groove. In this case, when locked in the locking groove, the tapered snap ring has an elastic restoring force in the direction of reducing the outer diameter. Furthermore, it is not included in the range of the present invention, however the fastening construction of the present invention can also be employed even when the member that receives a thrust load is not a bearing is attached and fastened to a member of mechanical apparatus to which this member is fastened.

EXPLANATION OF THE REFERENCE NUMBERS

1 Steering wheel
2 Steering column
3 Motor
4 Intermediate shaft
5, 5a Pinion shaft
6, 6a, 6b Steering gear unit
7 Tie rod
8 Pinion teeth
9 Rack shaft
10 Rack teeth
11, 11a Housing
12, 12a Main housing unit
13, 13a Sub housing unit
14, 14a Radial needle bearing
15 Ball bearing
16 Inner ring
17 Outer ring
18 Inner-diameter side stepped surface
19 Conical snap ring
20 Outer-diameter side stepped surface
21 Locking screw cylinder
22, 22a Cylinder section
23 Slide type rack guide
24 Pressure block
25 Cover
26 Spring
27 Locking groove
28, 28a, 28b, 28c, 28d Tapered snap ring
29 Non-continuous section
30, 30a, 30b, 30c Inclined side surface
31, 31a, 31b Orthogonal side surface
32, 32a Inclined groove side surface
33 Orthogonal groove side surface
34 One side surface in the axial direction
35, 35a Gap
36 Rolling type rack guide
37 Retaining cylinder
38 Support shaft
39 Radial needle bearing
40 Roller
41 Ring-shaped protrusion
42 Gap
43 Chamfer section
44 Contact point
45, 45a Engagement position
46 Protrusion
47 Ring-shaped concave groove

What is claimed is:
1. A construction for fastening a bearing, the construction comprising:
   a member of a mechanical apparatus;
   a bearing that fits with the member and supports thrust loads, the bearing comprising a bearing ring;
   a tapered snap ring for fastening the bearing ring to the member; and
   a ring-shaped locking groove that is formed in the member and that is for locking the tapered snap ring;
   the tapered snap ring having a thickness in an axial direction, the snap ring comprising
      a first side in the axial direction that is locked in the locking groove, the first side comprising an inclined side surface, the inclined side surface being inclined such that the thickness of the tapered snap ring in the axial direction becomes smaller toward the locking groove side; and
      a second side in the axial direction that comes in contact with a side surface on one side in the axial direction of the bearing ring, the second side comprising an orthogonal side surface that is orthogonal to a center axis of the bearing;
   the locking groove comprising
      a first side surface on the first side in the axial direction having an inclined groove side surface that is inclined in a same direction as the inclined side surface of the tapered snap ring; and a second side surface on a second side in the axial direction having an orthogonal groove side surface that is orthogonal to the center axis of the bearing;

the bearing ring being positioned on the member so that a length in the axial direction between a circumferential edge of the first side surface in the axial direction of the locking groove and the surface on the one side in the axial direction of the bearing ring is less than a maximum thickness of the tapered snap ring; and in a state wherein the tapered snap ring is locked in the locking groove and the bearing ring is fastened to the member, a gap in the axial direction being formed between the orthogonal side surface of the tapered snap ring and the second side surface in the axial direction of the locking groove;

wherein a ring-shaped protrusion is formed in a position on the orthogonal side surface of the tapered snap ring that faces the second side surface of the locking groove, and the ring-shaped protrusion protruding from the orthogonal side surface of the tapered snap ring toward the second side surface of the locking groove.

2. A construction for fastening a bearing, the construction comprising:

a member of a mechanical apparatus;

a bearing that fits with the member and supports thrust loads, the bearing comprising a bearing ring;

a tapered snap ring for fastening the bearing ring to the member; and a ring-shaped locking groove that is formed in the member and that is for locking the tapered snap ring;

the tapered snap ring having a thickness in an axial direction, the snap ring comprising a first side in the axial direction that is locked in the locking groove, the first side comprising an inclined side surface, the inclined side surface being inclined such that the thickness of the tapered snap ring in the axial direction becomes smaller toward a locking groove side; and a second side in the axial direction that comes in contact with a side surface on one side in the axial direction of the bearing ring, the second side comprising an orthogonal side surface that is orthogonal to a center axis of the bearing;

the locking groove comprising a first side surface on the first side in the axial direction having an inclined groove side surface that is inclined in a same direction as the inclined side surface of the tapered snap ring; and a second side surface on a second side in the axial direction having an orthogonal groove side surface that is orthogonal to the center axis of the bearing;

the bearing ring being positioned on the member so that a length in the axial direction between a circumferential edge of the first side surface in the axial direction of the locking groove and the surface on the one side in the axial direction of the bearing ring is less than a maximum thickness of the tapered snap ring; and in a state wherein the tapered snap ring is locked in the locking groove and the bearing ring is fastened to the member, a gap in the axial direction being formed between the orthogonal side surface of the tapered snap ring and the second side surface in the axial direction of the locking groove;

wherein the length in the axial direction of the gap is 0.1 mm or less.

3. A construction for fastening a bearing, the construction comprising:

a member of a mechanical apparatus;

a bearing that fits with the member and supports thrust loads, the bearing comprising a bearing ring;

a tapered snap ring for fastening the bearing ring to the member; and a ring-shaped locking groove that is formed in the member and that is for locking the tapered snap ring;

the tapered snap ring having a thickness in an axial direction, the snap ring comprising a first side in the axial direction that is locked in the locking groove, the first side comprising an inclined side surface, the inclined side surface being inclined such that the thickness of the tapered snap ring in the axial direction becomes smaller toward a locking groove side; and a second side in the axial direction that comes in contact with a side surface on one side in the axial direction of the bearing ring, the second side comprising an orthogonal side surface that is orthogonal to a center axis of the bearing;

the locking groove comprising a first side surface on the first side in the axial direction having an inclined groove side surface that is inclined in a same direction as the inclined side surface of the tapered snap ring; and a second side surface on a second side in the axial direction having an orthogonal groove side surface that is orthogonal to the center axis of the bearing;

the bearing ring being positioned on the member so that a length in the axial direction between a circumferential edge of the first side surface in the axial direction of the locking groove and the surface on the one side in the axial direction of the bearing ring is less than a maximum thickness of the tapered snap ring; and in a state wherein the tapered snap ring is locked in the locking groove and the bearing ring is fastened to the member, a gap in the axial direction being formed between the orthogonal side surface of the tapered snap ring and the second side surface in the axial direction of the locking groove;

wherein an angle between a virtual plane that is orthogonal to the center axis of the bearing and the inclined side surface of the tapered snap ring is greater than an angle between the virtual plane and the inclined groove side surface of the locking groove.

4. The construction for fastening a bearing according to claim 3, wherein a chamfered section is formed in a continuous section between a circumferential surface of the bearing ring that fits with the member and the one side surface in the axial direction of the bearing ring, and wherein a radius of curvature of the chamfered section is 0.5 mm or less.

5. A steering gear unit, comprising:

a housing;

a rack shaft that is supported by the housing so as to be able to move back and forth, and that is for changing a steering angle of steered wheels by way of tie rods, and has rack teeth;

a pinion shaft that is connected to a steering wheel at one end, and that has pinion teeth that engage with the rack teeth of the rack shaft, and that is for transmitting rotation of the steering wheel to the rack shaft;

a first bearing that comprises an outer ring that is fitted into an inner circumferential surface of the housing, and an inner ring that is fitted onto an outer circumferential surface of a middle section of the pinion shaft, and that, with supporting the middle section of the pinion shaft on the housing so as to be able to rotate, supports thrust loads that act on the pinion shaft;

a second bearing that is fitted into the inner circumferential surface of the housing, and that, with supporting a second end of the pinion shaft on the housing so as to be able to rotate, supports radial loads that act on the pinion shaft;

a tapered snap ring for fastening one of the outer ring and the inner ring of the first bearing to the housing or the middle section of the pinion shaft; and, a ring-shaped locking groove that is formed in one of the housing or the middle section of the pinion shaft and that is for locking the tapered snap ring;

the tapered snap ring having a thickness in an axial direction, the tapered snap ring comprising a first side in the axial direction that is locked in the locking groove, the first side comprising an inclined side surface, the inclined side surface being inclined such that the thickness of the tapered snap ring in the axial direction becomes smaller toward a locking groove side; and a second side in the axial direction that comes in contact with a side surface on one side in the axial direction of the one of the outer ring and the inner ring of the bearing, the second side comprising an orthogonal side surface that is orthogonal to a center axis of the first bearing;

the locking groove comprising a first side surface on the first side in the axial direction having an inclined groove side surface that is inclined in a same direction as the inclined side surface of the tapered snap ring; and a second side surface on the second side in the axial direction having an orthogonal groove side surface that is orthogonal to the center axis of the first bearing;

the one of the outer ring and the inner ring of the first bearing being positioned on the housing or the middle section of the pinion shaft so that a length in the axial direction between a circumferential edge of the first side surface in the axial direction of the locking groove and the surface on the one side in the axial direction of the bearing is less than a maximum thickness of the tapered snap ring; and in a state wherein the tapered snap ring is locked in the locking groove and the one of the outer ring and the inner ring of the first bearing is fastened to the housing or the middle section of the pinion shaft, a gap in the axial direction being formed between the orthogonal side surface of the tapered snap ring and the second side surface in the axial direction of the locking groove;

wherein an angle between a virtual plane that is orthogonal to the center axis of the first bearing and the inclined side surface of the tapered snap ring is greater than an angle between the virtual plane and the inclined groove side surface of the locking groove.

* * * * *